United States Patent
Beran et al.

(10) Patent No.: US 10,808,334 B2
(45) Date of Patent: Oct. 20, 2020

(54) METHOD FOR PRODUCING POLYMERIC NANOFIBERS BY ELECTROSPINNING OF A POLYMER SOLUTION OR MELT, A SPINNING ELECTRODE FOR PERFORMING THE METHOD AND A DEVICE FOR PRODUCING POLYMERIC NANOFIBERS EQUIPPED WITH AT LEAST ONE SUCH SPINNING ELECTRODE

(71) Applicant: Technicka univerzita v Liberci, Liberec (CZ)

(72) Inventors: Jaroslav Beran, Liberec (CZ); Jan Valtera, Liberec (CZ); Martin Bilek, Liberec (CZ); Josef Skrivanek, Frydlant v Cechach (CZ); Ondrej Batka, Liberec (CZ); David Lukas, Rochlice (CZ); Pavel Pokorny, Frydlant v Cechach (CZ); Tomas Kalous, Liberec (CZ); Julie Soukupova, Tremosna u Plzne (CZ); Eva Kostakova, Turnov (CZ)

(73) Assignee: TECHNICKA UNIVERZITA V LIBERCI (CZ)

(*) Notice: Subject to any disclaimer, the term of this patent is extended or adjusted under 35 U.S.C. 154(b) by 0 days.

(21) Appl. No.: 16/064,704

(22) PCT Filed: Dec. 19, 2016

(86) PCT No.: PCT/CZ2016/050045
§ 371 (c)(1),
(2) Date: Jun. 21, 2018

(87) PCT Pub. No.: WO2017/108012
PCT Pub. Date: Jun. 29, 2017

(65) Prior Publication Data
US 2018/0371645 A1    Dec. 27, 2018

(30) Foreign Application Priority Data
Dec. 21, 2015  (CZ) .................................. 2015-928

(51) Int. Cl.
*D04H 1/728* (2012.01)
*D01D 5/00* (2006.01)
*B82Y 40/00* (2011.01)

(52) U.S. Cl.
CPC .......... *D01D 5/0069* (2013.01); *D01D 5/003* (2013.01); *D01D 5/0023* (2013.01);
(Continued)

(58) Field of Classification Search
CPC .... D01D 5/0069; D01D 5/0061; D01D 5/003; D01D 5/0053; D01D 5/0023; D04H 1/728
(Continued)

(56) References Cited

U.S. PATENT DOCUMENTS

2016/0047062 A1* 2/2016 Greenawalt .......... D01D 5/0069
264/465

\* cited by examiner

Primary Examiner — Jacob T Minskey
Assistant Examiner — Adrien J Bernard
(74) Attorney, Agent, or Firm — Ostrolenk Faber LLP (57) ABSTRACT

The invention relates to a spinning electrode (1) for producing polymeric nanofibers by electrospinning of a polymer solution or polymer melt, containing an inlet pipe (2) of the polymer solution or melt, which ends on its top face (3), whereby around at least a part of the mouth (20) on the top face of the inlet pipe (2) of the polymer solution or melt is formed a spinning surface (4) rounded downwards below the mouth (20), whereby the spinning surface (4) continues as a collecting surface (6) on the outer surface of the inlet pipe (2) of the polymer solution or melt.

The invention also relates to a device for producing nanofibers by electrospinning of a polymer solution or melt, which is equipped with at least one spinning electrode (1) according to the invention.

(Continued)

In addition, the invention relates to a method for producing nanofibers by electrospinning of a polymer solution or melt, which is based on using the spinning electrode according to the invention.

1 Claim, 5 Drawing Sheets

(52) U.S. Cl.
CPC ........... *D01D 5/0061* (2013.01); *D04H 1/728* (2013.01); *B82Y 40/00* (2013.01)

(58) Field of Classification Search
USPC ..................................... 425/174.8 R, 174.8 E
See application file for complete search history.

METHOD FOR PRODUCING POLYMERIC NANOFIBERS BY ELECTROSPINNING OF A POLYMER SOLUTION OR MELT, A SPINNING ELECTRODE FOR PERFORMING THE METHOD AND A DEVICE FOR PRODUCING POLYMERIC NANOFIBERS EQUIPPED WITH AT LEAST ONE SUCH SPINNING ELECTRODE

TECHNICAL FIELD

The invention relates to a spinning electrode for producing polymeric nanofibers by electrospinning of a polymer solution or melt.

The invention also relates to a device for producing nanofibers by electrospinning of a polymer solution or melt, equipped with at least one such spinning electrode.

In addition, the invention also relates to a method for producing nanofibers through electrospinning of a polymer solution or melt.

BACKGROUND ART

Nowadays, two basic types of spinning electrodes are used for producing polymeric nanofibers (i.e. fibers under 1000 nm in diameter) by electrostatic (i.e. using high DC electric voltage) spinning of a polymer solution or melt. The first of them is a moving body—most often a rotating cylinder or a spiral, whose threads are situated on a cylindrical surface, the moving body being partially immersed in the polymer solution or melt, placed in a suitable container. At the same time, the polymer solution or melt is brought into an electrostatic field on the surface of the body (see, e.g., WO 2005024101). A second type of the spinning electrode is a tube, or, more specifically, a nozzle or a capillary, to whose tip, which is positioned in an electrostatic field, a polymer solution or melt is fed through its cavity (see, e.g., WO 2005042813).

In addition, these spinning electrodes can be also used during the so-called "electrospinning" (or "AC electrospinning") using the method according to CZ patent 304137, wherein for the production of polymeric nanofibers is used an alternating electrical voltage, which is supplied only to the spinning electrode/electrodes. An electric field for the production of nanofibers is created between the spinning electrode and oppositely charged air ions and/or gas ions, which are generated in its vicinity by the ionization of the surrounding air or gas, and/or are fed into its vicinity from a ion source, and/or oppositely charged nanofibers formed in the previous moment.

The drawback of the so far known spinning electrodes composed of a rod, a tube, or a nozzle is the fact that electric voltage, which is supplied to them, substantially concentrates the intensity of the electric field on their sharp edges—especially in the transitional area between their top faces and their casings, which does not permit to use fully their working surface, which is already limited (usually having a diameter of under 1 mm), and therefore these electrodes only have a very low spinning output.

Figure 11:
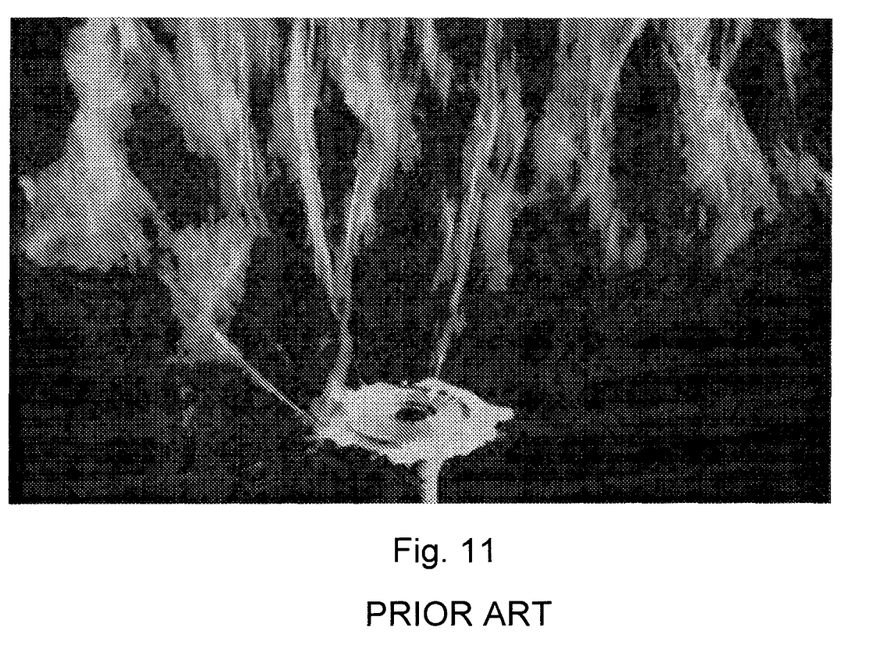
FIG. 11 shows a photograph of the spinning electrode during electrospinning using the method according to the background art with undesirable deposit of nanofibers on its upper edge.

Moreover, during electrospinning a small part of the nanofibers previously formed return back to the surface of the spinning electrode due to electric attractive forces, where they are deposited, forming a deposit resembling a blossom, which gradually causes a decrease in the spinning output of the electrode, see, e.g., FIG. 11, and after a relatively short period of time, completely interrupts the spinning process.

The aim of the invention is to propose a spinning electrode which would remove the shortcomings of the existing electrodes composed of a tube or a nozzle, i.e. would enable to increase not only their current spinning output, but, at the same time, to prolong the duration of continuous electrospinning.

In addition, the aim of the invention is to propose a device for producing nanofibers and a method for electrospinning of the polymer solution or melt, which by using the spinning electrode according to the invention would eliminate the disadvantages of electrospinning when using known electrodes.

PRINCIPLE OF INVENTION

The goal of the invention is achieved by a spinning electrode for producing polymeric nanofibers by electrospinning of a polymer solution or melt, whereby the electrode contains an inlet pipe of the polymer solution or melt, which opens into top face of the spinning electrode, whereby a spinning surface is created around at least a part of the mouth of the inlet pipe of the polymer solution or melt on the top face of the spinning electrode, the spinning surface being rounded downwards below the mouth. A downwards oriented collecting surface is formed adjacent to the spinning surface on the outer surface of the inlet pipe of the polymer solution or melt. This construction of the spinning electrode enables to form most polymeric nanofibers under identical conditions—in the same part of the electric field and at the same intensity, or, more specifically, the same extent of the force action of the field on the polymer solution or melt. Consequently, these nanofibers have very similar parameters, especially the diameter, or, in other words, a small variance in these parameters, and in addition, it is possible to increase the surface area, from which spinning is performed, thereby increasing the amount of the nanofibers being formed.

In a preferred variant of embodiment, the wall of the inlet pipe of the polymer solution or melt extends outwards towards the mouth of the inlet pipe, whereby a spinning surface is formed around at least a part of the mouth on the extended top face of the spinning electrode, the spinning surface being rounded downwards below the mouth, whereby the spinning surface continues as a downwards oriented collecting surface arranged on the outer surface of the inlet pipe of the polymer solution or melt. The advantage of this variant is the fact that at least a part of the collecting surface is arranged in an electric shadow with a low intensity of the electric field under the extension of the wall of the inlet pipe of the polymer solution or melt, which considerably reduces danger of undesired spinning of the solution or the melt from this surface.

In most variants of the spinning electrode according to the invention, between the mouth of the inlet pipe of the polymer solution or melt and the spinning surface is formed a planar, rounded or pointed transport surface oriented upwards or downwards. This transport surface continues as a spinning surface. The transport surface is primarily intended to transport the polymer solution or melt from the inlet pipe of the polymer solution or melt to the spinning surface of the spinning electrode.

In order to prevent accidental spinning of the polymer solution or melt from the collecting surface of the spinning electrode, at least a part of the inlet pipe of the polymer solution or melt is along its entire circumference covered with a cover beneath the spinning surface. In addition, between the outer surface of the inlet pipe of the polymer solution or melt and the inner surface of the cover a gap is formed for collecting and withdrawing the polymer solution or melt.

For example, to form a mixture of nanofibers or bicomponent nanofibers a spinning electrode containing at least two mutually separated inlet pipes of the polymer solution or melt is designed, whereby around at least a part of the mouth of each of the inlet pipes is arranged a separate spinning surface, which is rounded downwards below the given mouth. Thus, it is possible to perform spinning from each of these separated spinning surfaces using different polymer solutions or melts, thereby creating a mixture of nanofibers, which differ in material and/or in diameter and/or in another parameter, e.g. the content of an active substance/substances, or the same nanofibers can be spun from them thereby increasing their production.

Preferably, separate spinning surfaces are arranged below each other and are oriented coaxially.

In another variant of embodiment, wherein the spinning electrode has more separated spinning surfaces, the collecting surface on the outer surface of the inlet pipe of the polymer solution or melt continues as a second transport surface, which further continues as a second rounded spinning surface, which is arranged on a greater outer diameter than the spinning surface arranged at least along a part of the circumference of the mouth of the inlet pipe of the polymer solution or melt, the second spinning surface having a smaller radius of the rounding than the spinning surface. The second spinning surface continues as a second collecting surface.

In the case of a suitable shape, e.g. when the spinning surface of the spinning electrode consists of at least two spinning sub-surfaces, rounded away from the mouth of the inlet pipe of the solution or melt, whereby there is a smooth transition between these rounded spinning sub-surfaces, whereby radii of the rounding of these sub-surfaces gradually decrease in the direction away from the mouth of the inlet pipe of the polymer solution or melt, or when its surface curve is composed of a suitable spline curve, i.e. a curve which corresponds to a polynomial function defined in intervals, it is possible to omit a transport surface between the mouth of the inlet pipe of the polymer solution or melt and the spinning surface of the spinning electrode, since in that case spinning is initiated immediately after the polymer solution or melt leaves the inlet pipe.

The extension of the wall of the inlet pipe of the polymer solution or melt may be an integral part of the inlet pipe of the polymer solution or melt, or it may be formed by a separate body mounted on or connected to the inlet pipe of the polymer solution or melt.

At least a part of the extension of the wall of the inlet pipe of the polymer solution or melt may have a constant outer diameter on at least part of its height—i.e. when considering circular cross section of the spinning electrode, it may be formed by a cylinder.

The spinning electrode according to the invention may be made of an electrically conductive material, but also of an electrically non-conductive material. In the second variant, the alternating electric voltage is supplied directly into the polymer solution or melt being spun.

The aim of the invention is also achieved by a device for the production of nanofibers by electrospinning of the polymer solution or melt, whose principle consists in that it is fitted with at least one spinning electrode according to the invention.

Furthermore, the aim of the invention is achieved by a method for producing nanofibers by electrospinning of a polymer solution or melt, in which the polymer solution or melt is fed through an inlet pipe of the polymer solution or melt which ends in the top face of a spinning electrode, whereby alternating electric voltage is supplied to the spinning electrode and/or to the polymer solution or melt. The principle of the method according to the invention consists in the fact that the polymer solution or melt flows over the top face of the spinning electrode due to the force of gravity and is spun from the spinning surface arranged around at least a part of the mouth of the polymer solution or melt, the spinning surface being rounded downwards below the mouth. At the same time, excess polymer solution or melt is fed to this spinning surface and the unspun polymer solution or melt washes the spinning surface of the spinning electrode, whereupon it flows down from it due to the force of gravity to the adjacent collecting surface on the outer surface of the inlet pipe of the polymer solution or melt.

If the spinning electrode has more spinning surfaces, the polymer solution or melt can be led from the collecting surface by the force of gravity to a second transport surface, which is rounded, oblique, horizontal or pointed, and from it to a second spinning surface, which is rounded and oriented downwards, or the same or different polymer solution or melt is fed to each spinning surface of the spinning electrode through the inlet pipe of the polymer solution or melt, which is spun on each spinning surface. Using different polymer solutions or melts results in creating a mixture of two types of nanofibers, which differ from each other in material and/or diameter and/or in possible content of an active substance/substances in the fiber material and/or another parameter.

In another variant, during the process of spinning of the polymer solution or melt from the spinning surface of the spinning electrode, a different polymer solution or melt is fed to this spinning surface from the second spinning surface arranged above it, and, as a result, bicomponent nanofibers are formed.

DESCRIPTION OF DRAWINGS

In the enclosed drawing, FIG. 1 schematically represents a longitudinal section of a first variant of embodiment of the spinning electrode according to the invention.

Finally.

EXAMPLES OF EMBODIMENT

The spinning electrode 1 according to the invention contains an inlet pipe 2 of a polymer solution or melt, which ends on its top face 3, whereby around at least a part of its mouth 20 is arranged a spinning surface 4, rounded downwards, which is primarily intended for spinning the polymer solution or melt, which is placed on it. The radius $R_Z$ of the rounding of the spinning surface 4 is designed in such a manner that greater electric field intensity is obtained on the spinning surface 4 of the spinning electrode for the production of polymeric nanofibers under the given conditions, or, more specifically, that critical minimum intensity of the electric field, during which spinning of the particular polymer solution or melt takes place, is obtained or exceeded, but at the same time without electrical breakdowns at this intensity.

In preferred variants of embodiment of the spinning electrode, the wall of the inlet pipe 2 of the polymer solution or melt extends towards its mouth 20 in an outward direction, and the spinning surface 4 is then arranged on the extended top face of the spinning electrode 1, this extension being an integral part of the inlet pipe 2 of the polymer solution or melt, or being composed of a separate body mounted on or connected to the inlet pipe 2 of the polymer solution or melt. Preferably, it is a gradual extension, but apart of that, there may be also a step extension, whereby this extension may have a constant outer diameter on at least a part of the length of the inlet pipe 2 of the polymer solution or melt—i.e. when considering the circular cross section of the spinning electrode 1 the extension may be at least partially formed by a cylinder—see, e.g., FIG. 2.

Between the mouth 20 of the inlet pipe 2 of the polymer solution or melt and the spinning surface 4 on the top face 3 of the spinning electrode is in case of need formed a planar and/or oblique and/or pointed and/or rounded transport surface 5, which connects the mouth 20 of the inlet pipe 2 of the polymer solution or melt and the spinning surface 4 of the spinning electrode 1 and which is primarily intended to transport the polymer solution or melt under the force of gravity to the spinning surface 4. If the transport surface 5 is rounded, the radius $R_T$ of its rounding is greater than the radius $R_Z$ of the rounding of the spinning surface 4. The oblique, pointed or rounded transport surface 5 may be oriented upwards or downwards.

Figure 1:
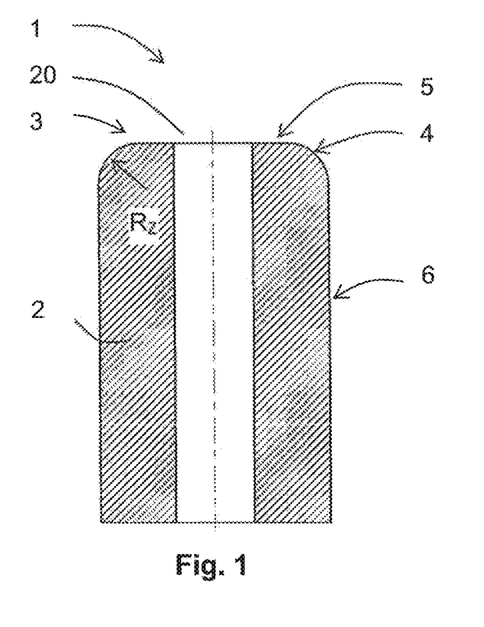

FIG. 1 represents a longitudinal section of a first variant of embodiment of the spinning electrode 1 according to the invention. This spinning electrode 1 contains an inlet pipe 2 of the polymer solution or melt formed by a hollow tube, whereby its mouth 20 on the top face 3 of the spinning electrode 1 is connected to a transport surface 5 in the shape of an annulus, which is designed horizontal in the shown variant of embodiment. This transport surface 5 continues as a rounded spinning surface 4 in the shape of an annulus oriented downwards below the mouth 20. This spinning surface 4 continues as a collecting surface 6, which is formed by the outer surface of the inlet pipe 2 of the polymer solution or melt and which serves primarily to collect and withdraw the unspun excess polymer solution or melt from the spinning surface 4.

Figure 3A:
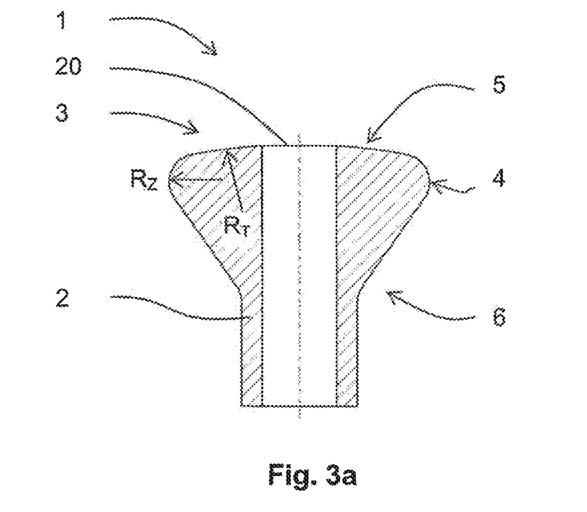
Figure 3B:
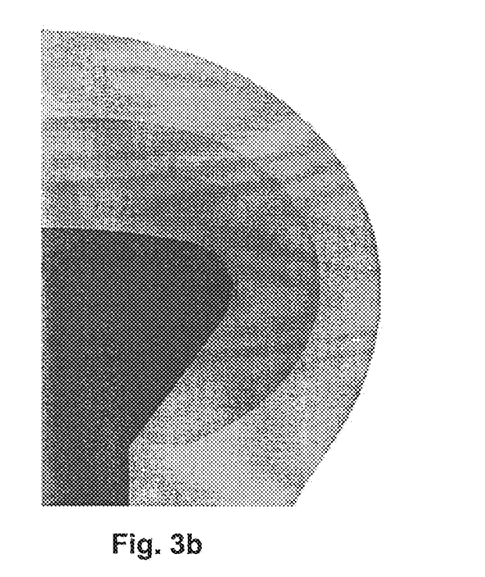
FIG. 3b represents the visualization of isosurfaces showing the course of the electric field intensity in the vicinity of the spinning electrode according to FIG. 3a, FIG. 4 shows a longitudinal section of a fourth variant of embodiment of the spinning electrode according to the invention.

The electric field is during spinning concentrated in the area of the spinning surface 4 of the spinning electrode 1—see, e.g., FIG. 3b, which represents the visualization of isosurfaces showing the course of the electric field intensity in the vicinity of the spinning electrode 1. As a result, the electric field reaches at this point the highest intensity, whereby it is here that the polymer solution or melt, which is at the particular moment situated on this spinning surface 4, is subject to electrospinning. Due to this, the vast majority of the nanofibers are formed under identical conditions—in the same part of the electric field and at the same intensity or extent with which the field force acts on the polymer solution or melt, and so they achieve very similar parameters, particularly the diameter, or, to be more specific, a smaller variance of these parameters. The thus prepared polymeric nanofibers, or layers or clusters of polymeric nanofibers are therefore considerably more uniform, and consequently also more suitable for real use.

In other unillustrated variants of embodiment of the spinning electrode 1 according to FIG. 1, its transport surface 5 may be created as a rounded, oblique or pointed surface, whereby it may be oriented upwards or downwards.

Figure 2:
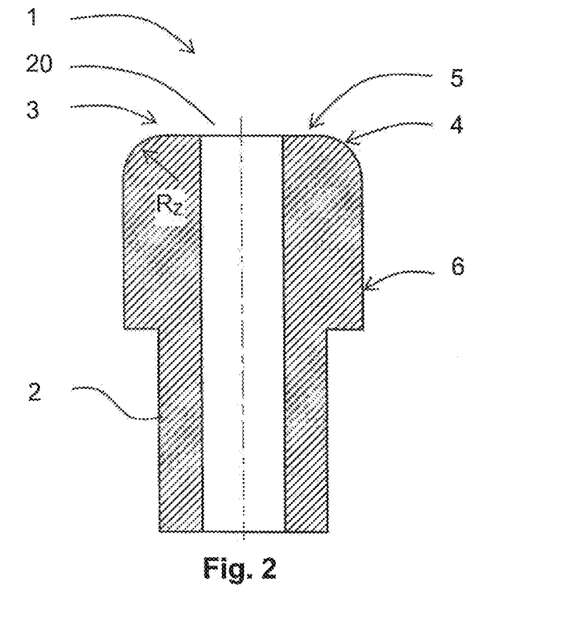
FIG. 2 shows a longitudinal section of a second variant of embodiment of the spinning electrode according to the invention, FIG. 3a schematically represents a longitudinal section of a third variant of embodiment of the spinning electrode according to the invention.

FIG. 2 shows a longitudinal section of a second exemplary variant of embodiment of the spinning electrode 1 according to the invention. This spinning electrode 1 contains an inlet pipe 2 of a polymer solution or melt composed of a hollow tube, whose wall extends sharply towards its mouth 20 on the top face 3 of the spinning electrode 1 in an outward direction, whereby the extension of the wall of the inlet pipe 20 of the polymer solution or melt has a constant outer diameter on at least a part of its height—it is formed by a cylinder. There is a smooth transition between the mouth 20 of the inlet pipe 2 of the polymer solution or melt on the extended top face 3 of the spinning electrode 1 a transport surface 5 in the shape of an annulus, which is created as a horizontal surface in the shown variant of embodiment. This transport surface 5 continues as a spinning surface 4 in the shape of an annulus, which is rounded, oriented downwards below the mouth 20. This spinning surface 4 further continues as a collecting surface 6, which serves primarily to collect and withdraw the unspun excess amount of the polymer solution or melt from the spinning surface 4. The collecting surface 6 is in the shown variant of embodiment formed by the outer surface of the inlet pipe 2 of the polymer solution or melt, whereby due to its sharp extension it is pointed. In addition, its substantial part is arranged in the electric "shadow" with a low intensity of the electric field below the extension of the wall of the inlet pipe 2 of the polymer solution or melt.

The electric field is during spinning concentrated in the area of the spinning surface 4 of the spinning electrode 1. As a result, the electric field reaches at this point the highest intensity, whereby here the polymer solution or melt, which is at the particular moment on this spinning surface 4, is subject to electrospinning. The vast majority of the nanofibers are due to this formed under identical conditions—in the same part of the electric field and at the same intensity or extent with which the field force acts on the polymer solution or melt, thereby achieving very similar parameters, particularly the diameter, or, to be more specific, a smaller variance of these parameters. The polymeric nanofibers thus prepared, or layers or clusters of polymeric nanofibers, are therefore considerably more uniform, and consequently also more suitable for real use.

In other unillustrated variants of embodiment of the spinning electrode 1 according to FIG. 1, its transport surface 5 may be created as rounded, oblique or pointed, whereby it may be oriented upwards or downwards. The extension of the wall of the inlet pipe 2 of the polymer solution or melt may be gradual, not instead of sharp extension, which means that the collecting surface 6 may be at least partially composed of an oblique or rounded surface.

FIG. 3a shows a longitudinal section of a third variant of an exemplary embodiment of the spinning electrode 1 according to the invention. This spinning electrode 1 contains an inlet pipe 2 of a polymer solution or melt composed of a hollow tube, whose wall continuously extends towards its mouth 20 on the top face 3 of the spinning electrode 1 in an outward direction. The mouth 20 on the extended top face 3 of the spinning electrode 1 continues as a transport surface 5 in the shape of an annulus, which is in the shown variant of embodiment rounded downwards. This transport surface 5 continues as a spinning surface 4 in the shape of an annulus, which is rounded and identically oriented, whereby radius $R_Z$ of its rounding is smaller than the radius $R_T$ of the rounding of the transport surface 5. The spinning surface 4 is arranged at the point of the greatest outer diameter of the wall of the inlet pipe 2 of the polymer solution or melt. The spinning surface 4 continues as a collecting surface 6, which serves primarily to collect and withdraw the unspun excess amount of the polymer solution or melt from the spinning surface 4. The collecting surface 6 is in the shown variant of embodiment formed by the outer surface of the inlet pipe 2 of the polymer solution or melt, whereby it is pointed due to its extension. Its substantial part is arranged in the electric "shadow" with a low intensity of the electric field below the extension of the wall of the inlet pipe 2 of the polymer solution or melt (see FIG. 3b).

The mouth 20 of the inlet pipe 2 of the polymer solution or melt is therefore in this variant of embodiment the highest part of the top face 3 of the spinning electrode 1.

The electric field is during spinning concentrated in the area of the spinning surface 4 of the spinning electrode 1—see, e.g., FIG. 3b, which represents the visualization of isosurfaces showing the course of the electric field intensity in the vicinity of the spinning electrode 1 in the embodiment according to FIG. 3a. As a result, the electric field reaches the highest intensity at this point, whereby it is here that the polymer solution or melt, which is at the particular moment situated on this spinning surface 4, is subject to electrospinning. Consequently, the vast majority of the nanofibers formed under identical conditions—in the same part of the electric field and at the same intensity or extent of the field force acting on the polymer solution or melt, thereby achieving very similar parameters, particularly the diameter, or, in other words, a smaller variance of these parameters. The polymeric nanofibers thus prepared, or layers or clusters of polymeric nanofibers, are therefore substantially more uniform, and consequently also more suitable for real use.

In other unillustrated variants of embodiment of the spinning electrode 1 according to FIG. 3a, its transport surface 5 can be created as planar or oblique, or, as the case may be, pointed. The collecting surface 6 may be designed rounded.

Figure 4:
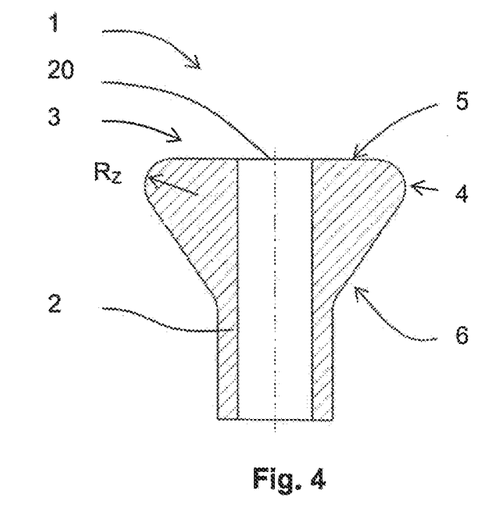

FIG. 4 shows a longitudinal section of a fourth variant of exemplary embodiment of the spinning electrode 1 according to the invention. This spinning electrode 1 is in terms of design nearly identical to the spinning electrode 1 shown in FIG. 3a, with the difference that in this variant the transport surface 5 on the top face 3 of the spinning electrode is designed as a planar surface, oriented in a plane with the mouth 20 of the inlet pipe 2 of the polymer solution or melt—in the shown variant of embodiment it is oriented horizontally.

Figure 5:
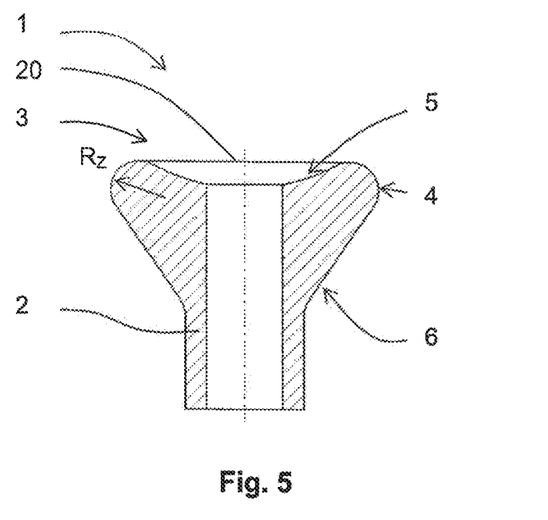
FIG. 5 shows a longitudinal section of a fifth variant of embodiment of the spinning electrode according to the invention.

FIG. 5 shows a longitudinal section of a fifth variant of exemplary embodiment of the spinning electrode 1 according to the invention. The design of this spinning electrode 1 is nearly identical to the spinning electrode 1 illustrated in FIG. 3, the only difference being the fact that in this variant transport surface 5 on the top face 3 of the spinning electrode 1 is made rounded and is oriented upwards—above the mouth 20 of the inlet pipe 2 of the polymer solution or melt.

In an unillustrated variant of embodiment, the transport surface 5 may be oblique or pointed.

Figure 6:
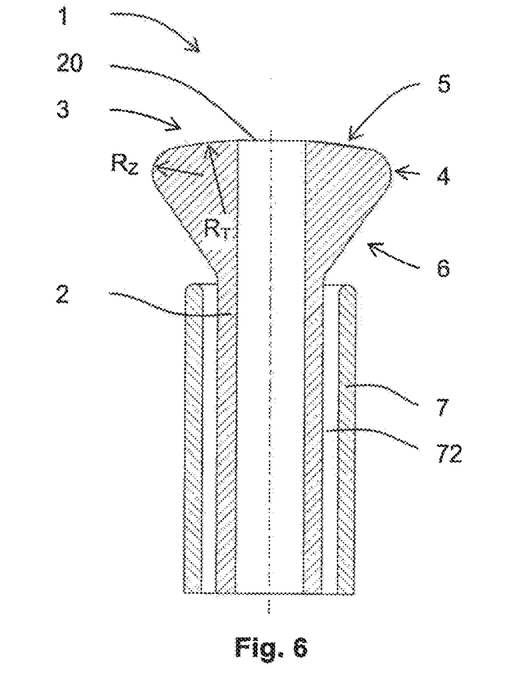
FIG. 6 shows a longitudinal section of a sixth variant of embodiment of the spinning electrode according to the invention based on the embodiment shown in FIG. 3.

FIG. 6 shows a longitudinal section of a sixth variant of exemplary embodiment of the spinning electrode 1 according to the invention. The construction of this spinning electrode 1 is nearly identical to the spinning electrode 1 illustrated in FIG. 3a, with the difference that in the shown variant of embodiment, a part of the outer surface of the inlet pipe 2 of the polymer solution or melt below the extension of its wall, or a part of the collecting surface 6, is covered with a tubular cover 7, which prevents undesirable spinning of the polymer solution or melt from this place of the surface of the spinning electrode 1. This tubular cover 7 is preferably made of an electrically nonconductive material, such as plastic. Between the cover 7 and the outer surface of the inlet pipe 2 of the polymer solution or melt a sufficient gap 72 is formed for smooth collecting and withdrawal of the unspun polymer solution or melt.

Optionally, the same or similar tubular cover 7 can be also used in any of the above- or below-described variants of the spinning electrode 1.

Figure 7:
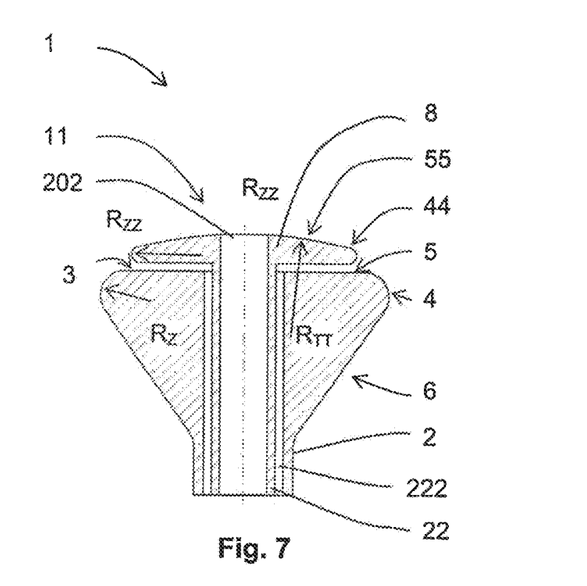
FIG. 7 shows a longitudinal section of a seventh variant of embodiment of the spinning electrode according to the invention with two spinning surfaces.

FIG. 7 shows a longitudinal section of a fifth variant of exemplary embodiment of the spinning electrode 1 according to the invention. This spinning electrode 1 is composed of the bodies of two spinning electrodes according to the invention, whereby it is based on the spinning electrode 1 shown in FIG. 4, which constitutes its basic body, which is complemented with a body of a second spinning electrode 11 of a similar design, which is the shown variant of embodiment mounted with a part of its inlet pipe 22 of the polymer solution or melt in the cavity of the inlet pipe 2 of the polymer solution or melt of the basic body of the spinning electrode 1 according to FIG. 4. The second spinning electrode 11 contains an inlet pipe 22 of the polymer solution or melt formed by a hollow tube, whose wall sharply extends at its end, above the transport surface 5 of the basic body of the spinning electrode 1 in an outward direction and forms a disk body 8, whereby the inlet pipe 22 of the polymer solution or melt terminates on its outer surface. There is a smooth transition between the mouth 202 of the inlet pipe 22 a transport surface 55 in the shape of an annulus, which is rounded downwards below the mouth 202. Further on, the transport surface 55 continues as an identically oriented rounded spinning surface 44 in the shape of an annulus, whose radius $R_{ZZ}$ of the rounding is in the shown variant of embodiment smaller than the radius $R_{TT}$ of the rounding of the transport surface 55 and which is arranged at the point of the greatest outer diameter of the disk body 8. Between the inner surface of the inlet pipe 2 of the polymer solution or melt of the basic body of the spinning electrode 1 and the outer surface of the inlet pipe 22 of the polymer solution or melt of the spinning electrode 11, the inlet pipe 22 being mounted in the inlet pipe 2 of the basic body of the spinning electrode 1, is formed a sufficient gap 222, which allows smooth supply of the polymer solution or melt to the transport surface 5 of the basic body of the spinning electrode 1.

During the using of this spinning electrode 1, the polymer solution or melt is fed through each of the inlet pipes 2, 22 of the polymer solution or melt over a respective transport surface 5, 55 to a respective spinning surface 4, 44 and is spun from the spinning surface 4, 44. In addition, it is possible to combine two different polymer solutions or melts (or a solution and a melt) and thus form a mixture of two types of nanofibers, which differ from each other in terms of material and/or diameter and/or possible content of an active substance/substances in the fiber material and/or in another parameter, or increase the production of one type of the nanofibers. The composition of the mixture of nanofibers thus formed can be, if appropriate, influenced by, e.g., restricting or closing the inlet of one of the polymer solutions/melts, and/or by increasing the supply of the second of them. If the polymer solution or melt flows over from the spinning surface 44 of the second spinning electrode 11 to the transport surface 5 or, more preferably, to the spinning surface 4 of the basic body of the spinning electrode 1, it is possible to spin bicomponent nanofibers from overlapping layers of two different polymer solutions or melts on the spinning surface 4 of the spinning electrode 1, whereby the bicomponent nanofibers contain both polymers. By the appropriate setting of the electric field and the spinning conditions, it is possible to obtain spun core-sheath type bicomponent nanofibers, whose sheath will be formed by polymer, whose solution or melt is supplied through the inlet pipe 22 of the second spinning electrode 11.

In unillustrated variants of embodiment of the spinning electrode 1 of this type, any of the above-described variants of the spinning electrode 1 can be used as its basic body 1. The second spinning electrode 11 then may contain, e.g., a horizontal or oblique or pointed transport surface 55, or, as the case may be, a rounded, oblique or pointed transport surface 55 oriented upwards above the mouth 202 of the inlet pipe 22 of the polymer solution or melt.

In the variant of embodiment shown in FIG. 7, the radius $R_{ZZ}$ of the rounding of the spinning surface 44 of the second spinning electrode 11 is smaller than the radius $R_Z$ of the rounding of the spinning surface 4 of the basic body of the spinning electrode 1. However, in other unillustrated variants it can be the other way round, or both the radii $R_Z$, $R_{ZZ}$ of the rounding are the same.

Figure 8:
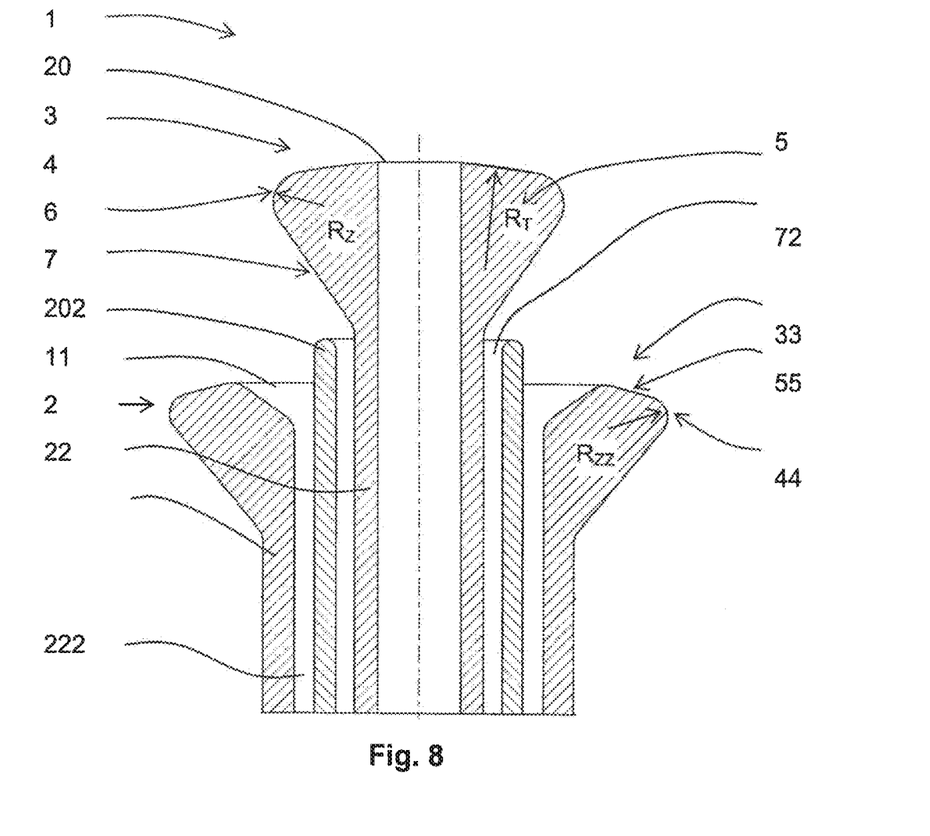
FIG. 8 shows a longitudinal section of an eighth variant of embodiment of the spinning electrode according to the invention with two spinning surfaces.

FIG. 8 shows a longitudinal section of a sixth variant of embodiment of the spinning electrode 1 according to the invention. This spinning electrode 1 is also formed by the composition of the bodies of two spinning electrodes according to the invention, whereby it is based on the spinning electrode 1 shown in FIG. 4, which constitutes the basic body of the spinning electrode 1 and which is supplemented with a second spinning electrode 11 of a similar design, which is arranged around its tubular cover 7. The second spinning electrode 11 contains an inlet pipe 22 of the polymer solution or melt composed of a hollow tube, whose wall, and in the shown variant of embodiment also its inner cavity (though not required), extends towards its end. Between the outer surface of the tubular cover 7 of the basic body of the spinning electrode and the inner surface of the inlet pipe 22 of the polymer solution or melt of the second spinning electrode 11 is formed a sufficient gap 222 for problem-free supply of the polymer solution or melt. There is a smooth transition between the the mouth 202 of the inlet pipe 22 of the polymer solution or melt of the second spinning electrode and an oblique transport surface 55 in the shape of an annulus, which is oriented downwards. This transport surface 55 continues as a spinning surface 44, rounded in a downward direction, whereby the radius Rzz of its rounding is smaller than the radius Rz of the rounding of the spinning surface 4 of the basic body of the spinning electrode 1, the spinning surface 44 being arranged at the point of the greatest outer diameter of the inlet pipe 22 of the polymer solution or melt of the second spinning electrode 11. This spinning surface 44 continues smoothly as a collecting surface, which serves primarily to collect and withdraw the unspun excess amount of the polymer solution or melt from the spinning surface 44. The collecting surface is in the shown variant of embodiment formed by the outer surface of the inlet pipe 22 of the polymer solution or melt of the second spinning electrode 11, whereby it is pointed due to its extension. Its substantial part is arranged in the electric "shadow" with a low intensity of the electric field, below the extension of the wall of the inlet pipe 22 of the polymer solution or melt. Preferably, a part of the outer surface of the inlet pipe 22 of the polymer solution or melt is covered with an unillustrated tubular cover.

When using this spinning electrode 1, the polymer solution or melt is fed through each of the inlet pipes 2, 22 of the polymer solution or melt over a respective transport surface 5, 55 to a respective spinning surface 4, 44 to be spun from the spinning surface 4, 44. In addition, it is possible to combine two different solutions or melts (or a solution or a melt) of polymer and thus form a mixture of two types of nanofibers, which differ from each other in terms of material and/or diameter and/or possible content of an active substance/substances in the fiber material and/or another parameter. The composition of the mixture of nanofibers thus formed can be, if appropriate, influenced by, e.g., restricting or closing the inlet pipe of one of the polymer solutions/melts, and/or by increasing the supply of the second of them. In another variant of embodiment, it is possible to feed the same polymer solution or melt through both the inlet pipes 2, 22 of the polymer solution or melt, and to use the construction of the spinning electrode 1 with two separate spinning surfaces 4, 44 to form greater amounts of nanofibers from the same material.

In unillustrated alternative embodiments of the spinning electrode 1 of this type, any of the above-described or below-described variants of the spinning electrode 1 of this type can be used as its basic body 1. The second spinning electrode may then contain, e.g., a horizontal, oblique or pointed transport surface 55, or, optionally, an oblique or pointed upwards oriented transport surface 55.

In the variant of embodiment shown in FIG. 6, the radius $R_{ZZ}$ of the rounding of the spinning surface 44 of the second spinning electrode 11 is smaller than radius $R_Z$ of the rounding of the spinning surface 4 of the basic body of the spinning electrode 1. However, in other unillustrated variants it may be the other way round, or the radii $R_Z$, $R_{ZZ}$ of the rounding may be identical.

Figure 9:
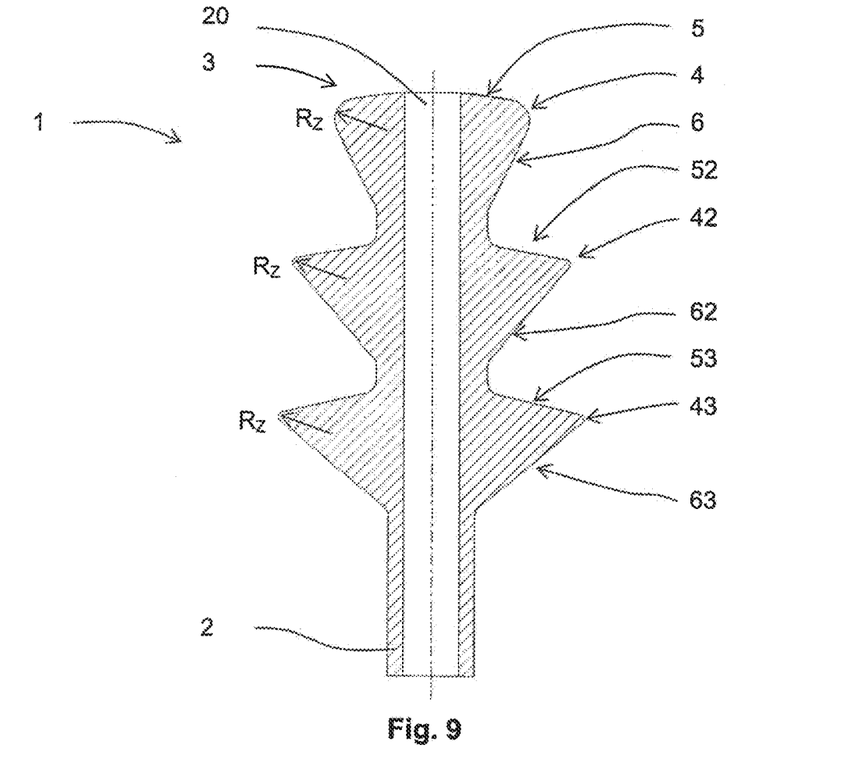
FIG. 9 shows a longitudinal section of an ninth variant of embodiment of the spinning electrode according to the invention with three spinning surfaces.

FIG. 9 shows a cross section of a seventh variant of exemplary embodiment of the spinning electrode 1 according to the invention. This spinning electrode 1 is based on the spinning electrode 1 shown in FIG. 3a (but in other unillustrated variants of embodiments, it may be based on any of the above-described types of the spinning electrode 1), whereby the collecting surface 6 continues as a second transport surface 52—in the shown variant an oblique, downward oriented transport surface 52 in the shape of an annulus formed on the outside of the extension of the wall of the inlet pipe 2 of the polymer solution or melt. Further on, the second transport surface 52 continues as a a second rounded spinning surface 42, which is arranged on the greater outer diameter than the spinning surface 4 on the extended top face of the spinning electrode 1, but with a smaller radius $R_Z$ of the rounding. The second spinning surface 42 continues as a second collecting surface 62, which serves primarily to collect and withdraw the unspun excess polymer solution or melt from the second spinning electrode 42. The second collecting surface 62 is in the shown variant of embodiment formed by the outer surface of the inlet pipe 2 of the polymer solution or melt, whereby it is pointed due to its extension. Its substantial part is therefore arranged in the electric "shadow" with a low intensity of the electric field, at the point of a smaller outer diameter of the inlet pipe 2 of the polymer solution or melt than the second spinning surface 42. Further on, the second collecting surface 62 continues as a third transport surface 53—in the shown variant an oblique, downwards oriented transport surface 53 in the shape of an annulus, formed on the outside of the extension of the wall of the inlet pipe 2 of the polymer solution or melt. The third transport surface 53 continues as a third rounded spinning surface 43, which is arranged on a greater outer diameter than the second spinning surface 42 and is designed with a smaller radius $R_Z$ of the rounding. The third spinning surface 43 continues as a third collecting surface 63, which serves primarily to collect and withdraw the unspun excess polymer solution or melt from the third spinning surface 43. The third collecting surface 63 is in the shown variant of embodiment formed by the outer surface of the inlet pipe 2 of the polymer solution or melt, whereby due to its extension it is pointed and its substantial part is therefore arranged in the electric "shadow" with a low intensity of the electric field, below the extension.

Thus, this spinning electrode 1 contains three concentrically arranged spinning surfaces 4, 42, 43, which enables to increase considerably the amount of the nanofibers being formed, whereby due to the decreasing radius $R_Z$ of the rounding of these spinning surfaces 4, 42, 43 it is possible to obtain similar or the same intensity of the electric field in the vicinity of each of them and, consequently, a very small variance of the diameters of the nanofibers being formed can be obtained.

In a similar manner, it is possible to form a spinning electrode 1, which will contain two concentrically arranged spinning surfaces 4, 42, 43, or, optionally, four or more concentrically arranged spinning surfaces 4, 42, 43. In addition, each of the transport surfaces 5, 52, 53 can be created as a horizontal or oblique, rounded or pointed surface oriented upwards or downwards.

In an unillustrated variant of embodiment, the inlet pipe 2 of the polymer solution or melt leads through at least one opening into the vicinity of each of the transport surfaces 52, 53, or directly on one of them.

Figure 10:
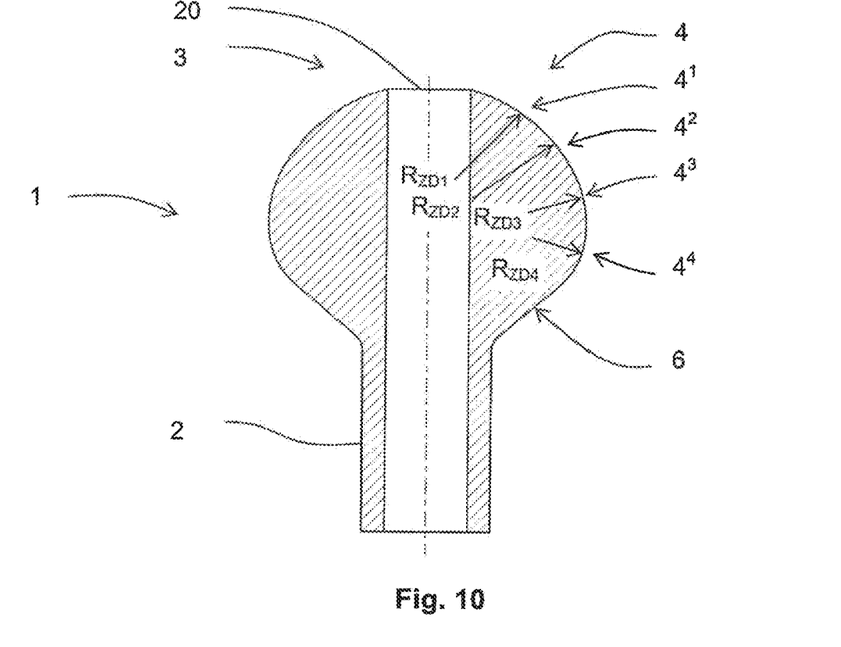
FIG. 10 shows a longitudinal section of a tenth variant of embodiment of the spinning electrode according to the invention with one spinning surface.

FIG. 10 shows a cross section through an eighth exemplary embodiment of the spinning electrode 1 according to the invention. The spinning electrode 1 contains an inlet pipe 2 of the polymer solution or melt formed by a hollow tube, whose wall gradually extends towards its end outwards and subsequently narrows again, whereby on the outer surface of the inlet pipe 2 it constitutes a combined spinning surface 4 consisting of four rounded spinning sub-surfaces $4^1$ to $4^4$, which are arranged next to each other with a smooth transitions between them in the direction away from the mouth 20 of the inlet pipe 2 of the polymer solution or melt. The radii $R_{ZD1}$ to $R_{ZD4}$ of the roundings of the spinning sub-surfaces $4^1$ to $4^4$ gradually decrease in the direction away from the mouth 20 of the inlet pipe 2 of the polymer solution or melt, but at the same time, their outer diameters become gradually greater. The rounded spinning sub-surface $4^4$ continues as a pointed collecting surface 6. The shape of the spinning surface 4 formed by at least two adjacent rounded spinning sub-surfaces $4^1$ a $4^2$, whose radii $R_{ZD1}$ to $R_{ZD4}$ of the rounding gradually decrease in the direction away from the mouth 20 of the inlet pipe 2 of the polymer solution or melt, but at the same time their outer diameter continuously increases, ensures that on the entire surface of the spinning surface 4 the electric field has a constant or substantially constant intensity, which is high enough to initiate electrospinning of a particular polymer solution or melt. Due to force of gravity, the polymer solution or melt flows over the entire spinning surface 4 thus shaped, whereby electrospinning is gradually initiated on the entire spinning surface 4, or on its substantial part. Due to the constant or substantially constant intensity of the electric field, the nanofibers being formed have the same or very similar parameters, especially the diameter.

The spinning surface 4 thus designed may consist of at least two rounded spinning sub-surfaces $4^1$, $4^2$, which are created adjacent to each other from the mouth 20 of the inlet pipe 2 of the polymer solution or melt and there is a smooth transition between them. The radii $R_{ZD1}$ and $R_{ZD2}$ of the rounding of the spinning sub-surfaces $4^1$, $4^2$ gradually decrease in the direction away from the mouth 20 of the inlet pipe 2 of the polymer solution or melt.

In another variant of embodiment, the spinning surface 4, which is the continuation of the mouth 20 of the inlet pipe 2 of the polymer solution or melt, is formed by a suitable surface "spline" curve (i.e. by a curve which corresponds to a polynomial function defined in intervals), which due to continuous change in the radius ensures the same or comparable intensity of the electric field along the entire spinning surface 4.

The spinning electrode 1 according to the invention may be made in all the above-described variants of embodiment both of an electrically conductive material and of electrically non-conductive material, whereby in the latter case during spinning electric voltage is brought directly to the polymer solution or melt for spinning, an electric field being formed between the solution or melt and the surrounding ions, or between the solution or melt and at least one collecting electrode arranged above the spinning electrode 1. In all the above-described variants, thanks to the shape of the spinning electrode 1, the polymer solution or melt moves over its top face and surface by force of gravity, therefore there is no undesirable sticking of the unspun polymer solution or melt or of the nanofibers formed during the previous process of spinning on the spinning surface 4 and, consequently, no gradual attenuation of spinning occurs.

In all the above-described variants of embodiment, the spinning electrode 1 and all its components have a circular cross section. However, apart from that, in other variants, its cross section may be any other shape, e.g., oval, triangular or multiangular—regular or irregular. In a specific variant, the cross section may be rectangular, whereby the mouth 20 of the inlet pipe 2 of the polymer solution or melt is formed by a rectangular slot (preferably with rounded corners), or a group of mouths 20 of any shape, arranged next to each other.

In all the above-described variants of the spinning electrode 1, the inner edge may be in the transition area between the mouth 20 of the inlet pipe 2 of the polymer solution or melt and the transport surface 5 or the spinning surface 4 created oblique or rounded.

The spinning electrode 1 according to the invention is intended to be used for electrospinning or alternating current electrospinning, in which the so-called "virtual collector" serves as a counter electrode. It is composed of ions and nanofibrous sections of opposite polarity prepared during the previous process of alternating current electrospinning. This virtual collector follows the shape of the surface of the spinning electrode 1, i.e. surrounds the spinning electrode 1, or, more precisely, surrounds its spinning surface/surfaces 4, 44, 444 in a specific distance of several centimeters, thereby contributing considerably to the high and evenly distributed intensity of the electric field. The resulting uniformity is, however, influenced especially by the shape of the spinning surface/surfaces 4, 44, 444 of the spinning electrode 1. The newly formed nanofibers partially recombine with those that have been already formed around the virtual counter-electrode. This process is constantly repeated owing to the nature of the alternating high voltage applied. Nanofibrous bundles of opposite polarity from emissions of opposite polarity following immediately one after another are mutually attracted and create a formation—a nanofibrous plume. This plume contains electrically recombined strands of nanofibers, which are formed by the spinning electrode, and moves away from the spinning electrode, along it axis. This motion of the plume arises due to the effect of the so-called "electric wind" produced by the spinning electrode. In a distance of approximately 5 cm (depending on the conditions of spinning) from the surface of the spinning electrode 1 the nanofibrous material inside the plume is internally immobile without any nanofibers regrouping.

The device for producing polymeric nanofibers by electrospinning in the sense of CZ 304137 contains at least one spinning electrode 1 of any above-described construction, whose inlet pipe 2 of the polymer solution or melt is connected to a source of the polymer solution or melt. The spinning electrode 1 and/or the polymer solution or melt is connected or adapted to be connected to the source of alternating electric current. In a preferred variant of embodiment, ion generator or another source of ions of air or other gases opens into the space above the spinning electrode 1. Furthermore, it is advantageous, but not necessary, if a stationary or static collector (electrically active or inactive) is mounted in the space above the spinning electrode 1 for collecting the nanofibers produced, or for drawing off the nanofibers by a stream of air or gas.

When applying a preferred method for producing polymeric nanofibers through electrospinning of the polymer solution or melt using the spinning electrode according to the invention, a greater amount of the polymer solution or melt is supplied through the inlet pipe 2 of the polymer solution or melt by means of a pump (not shown) to the spinning surface/surfaces 4, 44, 444 of the spinning electrode 1, the amount of the polymer solution or melt being greater than is the amount which can be transformed into nanofibers under the given conditions. The unspun excess amount of the polymer solution or melt due to force of gravity flows over the spinning surface/surfaces 4, 44, 444 and is removed by the collecting surface 6 to an unillustrated collecting vessel or to the waste. This polymer solution or melt may be reintroduced from the collecting vessel into the inlet pipe 2 of the polymer solution or melt, or to the reservoir of the polymer solution or melt with a fresh solution or melt, and from there to the inlet pipe 2 of the polymer solution or melt. In case of need, it is possible to recycle the polymer solution or melt before reintroducing it into the inlet pipe 2, e.g. by adding a solvent, or by additional heating and the like.

The excess polymer solution or melt fed to the spinning surface/surfaces 4, 44, 444 of the spinning electrode 1, combined with the uniform distribution of the electric field along this spinning surface/these spinning surfaces 4, 44, 444, enables to create nanofibers of the same type on the entire spinning surface, or on all the spinning surfaces 4, 44, 444, thereby considerably enhancing the spinning output achieved. During this procedure, the spinning surface/surfaces 4, 44, 444 of the spinning electrode 1 is/are simultaneously constantly washed by the unspun excess amount of the polymer solution or melt, therefore there is no undesirable sticking of the solidified polymer solution an nanofibers or the polymer melt on it/them, whereby this self-cleaning effect ensures that spinning can take place with the same or substantially unchanged intensity for a substantially unlimited time period.

During the using of the spinning electrode 1 shown in FIG. 7, it is advantageous if the polymer solution or melt, which is fed to the spinning surface 44 of the second spinning electrode 11, is not spun from this spinning surface, but flows down this surface to a transport surface 5 or, more preferably, to the spinning surface 4 of the basic body of the spinning electrode 1, whereby from this spinning surface 4 core-sheath nanofibers are spun, whose sheath is formed by polymer, the solution or melts of which is supplied over the spinning surface 44 of the second spinning electrode and forms a double layer of polymeric solutions on the spinning surface 4. Consequently, sheath-core bicomponent nanofibers are formed in these places. Their sheath consists of an upper layer of polymer and the core consists of a lower layer of polymer, which is drawn into a polymer nozzle due to the natural hydrodynamics of the process.

The invention claimed is:

1. A nanofiber spinning electrode configured to produce polymeric nanofibers by electrospinning of a polymer solution or polymer melt, the electrode comprising:
   an inlet pipe configured to receive and to convey the polymer solution or melt toward a primary collection site away from the electrode;
   a top face defining a distal end of the electrode at a terminal end of the inlet pipe, the top face having a mouth of the inlet pipe configured to convey the polymer solution or polymer melt;
   a nanofiber spinning surface configured to project the polymeric nanofibers towards the primary collection site;
   wherein the nanofiber spinning surface is curved at every point of the surface and includes at least a substantial portion of the top face, the nanofiber spinning surface extending to a collecting surface formed on an outer lateral surface of the inlet pipe.

* * * * *